United States Patent Office 3,036,908
Patented May 29, 1962

3,036,908
METHOD OF DESTROYING WEEDS
Fredo Günther, Berlin-Steglitz, Germany, assignor to Schering A.G., Berlin, Germany, a corporation of Germany
No Drawing. Filed Mar. 3, 1959, Ser. No. 796,758
Claims priority, application Germany Mar. 5, 1958
1 Claim. (Cl. 71—2.4)

This invention relates to weed killers, and particularly to weed killing agents comprising halogen- and/or alkyl-substituted phenoxyacetic, phenoxypropionic and phenoxybutyric acids in combination with soluble phosphates.

It is known to utilize various chemical substances for the destruction of weeds prior to undertaking cultivation. And it has been proposed that such weed destruction be combined with fertilization so that the active weed killing agents are admixed with fertilizers in solid condition, whereby the fertilizer serves as a means of distributing the weed killer.

It was now found in accordance with this invention, that the growth herbicides used for weed destruction can be considerably increased in activity when applied to cultivated stands after the germinating of the cultivated plants and weeds by adding to the conventionally used aqueous sprays of growth herbicides a water soluble salt of a phosphoric acid, in such an amount that about 0.25–1.5 kg. of $P_2O_5$ are applied per hectare.

As growth herbicides there are suitable for this purpose halogen- and/or alkyl-substituted phenoxyacetic, phenoxypropionic acid or phenoxybutyric acids and their salts having the formula:

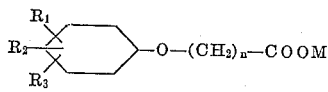

wherein $R_1$ and $R_2$ are members selected from the group consisting of hydrogen, halogen and alkyl, $R_3$ is a member selected from the group consisting of halogen and alkyl, M is a member selected from the group consisting of hydrogen, an alkali metal, and an aliphatic amine, and $n$ is an integer from 1 to 3. These phenoxy acid derivatives may be used individually or in admixture with one another. Within the contemplation of this invention, other herbicides may also be added to the weed killing compositions disclosed herein. Besides the free acids, there may be employed for this purpose the salts of said acids, such as the metal salts or the amine salts. Such metal salts may include, for example, the salts of the alkali metals, such as the sodium, potassium, and ammonium salts. Amine salts may also be used, such as, for example, the diethylamine salt, the diethanolamine salt, and the like.

As examples of ring-substituted phenoxy acids which may be employed in accordance with the present invention, there are mentioned:

4-monochlorphenoxyacetic acid
2-methyl-4-chlorphenoxyacetic acid
2,4-dichlorphenoxyacetic acid
3,4-dichlorphenoxyacetic acid
2,4,5-trichlorphenoxyacetic acid
4-monochlorphenoxypropionic acid
2-methyl-4-chlorphenoxypropionic acid
2,4-dichlorphenoxypropionic acid
3,4-dichlorphenoxypropionic acid
2,4,5-trichlorphenoxypropionic acid
4-monochlorphenoxybutyric acid
2-methyl-4-chlorphenoxybutyric acid
3,4-dichlorphenoxybutyric acid
2,4-dichlorphenoxybutyric acid
2,4,5-trichlorphenoxybutyric acid In accordance with the present invention, it has been found that when there is added to aqueous spraying compositions prepared with these compounds a small amount of a water soluble salt of a phosphoric acid, there is obtained surprisingly and unexpectedly a much more intense destruction of weeds than without such an addition. Suitable water soluble salts include the salts of orthophosphoric acid and pyrophosphoric acid. The water soluble phosphates which are advantageously employed include for example, the alkali metal salts of the aforementioned phosphoric acids such as the sodium, potassium, and ammonium salts, but also the calcium salts such as for example $Ca(H_2PO_4)_2$.

In accordance with the invention, the phosphates are added to the spraying compositions in such low concentrations that they produce no fertilizing effect whatever. In general the amount of phosphate added need not exceed about 5.0 kg. of $P_2O_5$ per hectare, but a significant augmentation of the herbicidal action is attained even with amounts as low as 0.25–1.5 kg. of $P_2O_5$ per hectare, as illustrated in the tests described below.

The necessary concentration of the aqueous compositions depends largely on the manner in which they are applied to the cultures, and on the cultures treated. The concentration must be higher for instance in solution applied by plane than in those applied on the ground by atomizing or by spraying. When a spraying composition of 400 l. is applied to one hectare the preferred concentrations are about 0.125 to 0.5% of growth herbicide and 0.125 to 0.5% of the water soluble phosphate.

In the following there are given only for illustration purpose some examples of spraying compositions.

(1) Two parts of the potassium salt of chloromethyl phenoxypropionic acid are mixed thoroughly with one part of $KH_2PO_4$. Three kg. of this product are dissolved in 400 l. of water and this solution is sprayed on one hectare of land carrying cereal crops.

(2) One part of the sodium salt of methylchlorophenoxypropionic acid is mixed thoroughly with 1 part of a mixture of 90% $Na_2H_2P_2O_7$ and 10% $Na_4P_2O_7$. Three kg. of this product dissolved in 400 l. of water are applied to one hectare.

(3) Three parts of the diethylamine salt of 2,4,5-trichlorphenoxypropionic acid and 1 part of potassium MCPA are mixed thoroughly with two parts of $Na_4P_2O_7$, dissolved and applied as indicated above under 2.

It has been further found, in accordance with this invention, that the spraying compositions should advantageously possesses a pH of 6 or more. This condition has the further advantage that the growth materials are better soluble, for in more strongly acid media a light turbidity could occur owing to precipitated material.

It was demonstrated, as shown in Example 4 below, that in the case of adequately fertilized soils, and even in the case of strongly overfertilized soils, a further significant increase in weed killing action was obtained by the addition of phosphates to the spraying composition in accordance with the present invention. That a genuine synergistic increase in activity is taking place is proved by the fact that upon spraying of phosphate alone no damage of any kind to the plants was observed, cf. Example 7.

In accordance with the present invention, therefore, there is provided a process which is based upon an entirely novel type of action, and one which was not provided by any method known heretofore.

The surprising and unexpected results obtainable by the composition and process of this invention are demonstrated by the following examples, but the invention is not to be regarded as limited thereto.

In the examples, the increase in weed killing activity was demonstrated in greenhouse tests at various temperatures using dicotyledonous plants of five different families, whereby the general applicability of the activity increase was proved. These plants included the following:

Caryophyllaceae: *Stellaria media*
Compositae:
    *Ageratum mexicanum*
    *Centaurea cyanus*
    *Galinsoga parviflora*
Cruciferae: *Sinapis alba*
Scrophulariaceae: *Antirrhinum majus*
Solanaceae: *Solanum lycopersicum*

Example 3 demonstrates that the weed killing activity increase occurs in open fields as well, and without any adverse effect upon selectivity.

The toxicity values given in the examples represent average values from a large number of evaluations during the test period. The evaluations are in terms of a scale ranging from 0 (plants undamaged) to 10 (plants dead). In the tables given below the abbreviations used to denote the compounds in question have the following meanings:

Abbreviations:
    MCPA-K—potassium salt of methylchlorphenoxyacetic acid
    MCPP-K—potassium salt of methylchlorphenoxypropionic acid
    2,4-D-Na—sodium salt of 2,4-dichlorphenoxyacetic acid
    2,4,5-T-Na—sodium salt of 2,4,5-trichlorphenoxyacetic acid
    MCPP-amin—diethanolamine salt of methylchlorphenoxypropionic acid
    MCPB-Na—sodium salt of methylchlorphenoxybutyric acid

EXAMPLE 1

*Greenhouse tests.*—The phytotoxicity of various herbicides with addition of various amounts of phosphates is shown in the following Table 1. The amount applied was 1,000 liters per hectare.

Table 1

| Plant | Herbicide | kg./ha. $KH_2PO_4$ | | | | | | | Average Temperature (° C.), during test period |
|---|---|---|---|---|---|---|---|---|---|
| | | 0 | 0.5 | 1 | 2 | 3 | 5 | 10 | |
| I—*Sinapis alba* (4-leaf-stage) | MCPP-K 1 kg./ha. | 4.1 | ------ | 5.0 | 5.0 | 5.0 | 5.0 | 5.3 | 21.3 |
| II—*Stellaria media* (10-leaf-stage) | MCPP-K 2 kg./ha. | 4.6 | ------ | 6.3 | 6.6 | 6.7 | 6.7 | 6.7 | 21.2 |
| III—*Centaurea cyanus* (4-leaf-stage) | MCPP-K 1 kg./ha. | 3.6 | ------ | 4.4 | 4.6 | 4.8 | ------ | 4.6 | 20.8 |
| | | kg./ha. $Na_4P_2O_7$ | | | | | | | |
| | | 0 | 0.5 | 1 | 2 | 3 | 5 | 10 | |
| IV—*Atriplex patulum*+*Galinsoga parviflora*+*Stellaria media* | MCPP-K 1 kg./ha. | 3.4 | 6.15 | 6.15 | 6.6 | 6.65 | ------ | 6.65 | 20.8 |

EXAMPLE 2

*Greenhouse tests.*—These tests demonstrate the phytotoxicity of various growth herbicides to various plants at various temperatures upon spraying with 1,000 liters per hectare. Each toxicity value is the average value for 8 evaluations during a test period of 4 weeks. D represents the average difference in toxicity value for a given growth herbicide between its action with and without potassium phosphate ($KH_2PO_4$) upon the test plants at the test temperatures. The results of these tests are shown in Table 2 below, in which the following abbreviations are used to denote the test plants:

Age.=*Ageratum mexicanum*
Ant.=*Antirrhinum majus*
Sin.=*Sinapis alba*
Sol.=*Solanum lycopersicum*
Ste.=*Stellaria media*

Table 2

| Agent, kg./ha. | MCPA-K 1 | | 2,4-D-Na 1 | | 2,4,5-T-Na 1 | | MCPP-Amin 1,9 | | MCPB-Na 1,6 | |
|---|---|---|---|---|---|---|---|---|---|---|
| $KH_2PO_4$, kg./ha. | 0 | 1 | 0 | 1 | 0 | 1 | 0 | 1 | 0 | 1 |
| Toxicity Values, ° C.: | | | | | | | | | | |
| Age.: | | | | | | | | | | |
| 23 | 6.6 | 6.7 | 7.0 | 7.1 | 6.0 | 6.5 | 4.0 | 9.0 | 4.4 | 8.1 |
| 18 | 3.3 | 3.6 | 3.9 | 4.1 | 3.5 | 3.9 | 3.6 | 5.3 | 2.5 | 3.7 |
| 12 | 2.6 | 3.1 | 2.4 | 3.3 | 3.8 | 3.9 | 3.3 | 6.4 | 2.8 | 4.6 |
| Ant.: | | | | | | | | | | |
| 23 | 4.5 | 6.4 | 5.3 | 6.0 | 4.9 | 5.8 | 6.1 | 7.8 | 4.4 | 8.6 |
| 18 | 4.0 | 5.3 | 3.8 | 4.4 | 4.1 | 4.1 | 4.1 | 6.5 | 3.9 | 4.8 |
| 12 | (¹) | (¹) | 4.8 | 5.6 | 3.6 | 4.9 | 3.9 | 4.5 | 3.8 | 6.0 |
| Sin.: | | | | | | | | | | |
| 23 | 5.5 | 6.3 | 5.4 | 7.1 | 3.6 | 5.4 | 5.3 | 5.9 | 2.4 | 3.1 |
| 18 | 3.6 | 3.6 | 3.3 | 4.0 | 2.8 | 3.9 | (¹) | (¹) | 1.8 | 2.9 |
| 12 | 3.1 | 4.3 | 3.5 | 4.5 | 3.5 | 3.5 | 3.6 | 3.8 | 1.3 | 2.0 |
| Sol.: | | | | | | | | | | |
| 23 | 3.75 | 5.75 | (¹) | (¹) | 4.0 | 8.0 | 5.3 | 8.2 | 2.7 | 8.7 |
| 18 | 4.0 | 4.9 | (¹) | (¹) | 4.0 | 4.0 | 4.4 | 5.8 | 3.1 | 3.8 |
| 12 | 3.8 | 4.8 | (¹) | (¹) | 4.0 | 5.1 | 4.5 | 5.0 | 3.0 | 3.9 |
| Ste.: | | | | | | | | | | |
| 23 | 2.0 | 4.1 | 1.5 | 1.5 | 1.5 | 1.9 | 6.3 | 7.0 | 1.0 | 2.3 |
| 18 | 3.7 | 4.5 | 1.3 | 2.1 | 1.7 | 3.3 | 4.8 | 7.8 | 3.0 | 4.5 |
| 12 | 3.5 | 3.5 | 2.4 | 2.8 | 2.3 | 3.1 | 4.7 | 5.8 | 3.0 | 3.5 |
| D | +0.92 | | +0.66 | | +0.93 | | +1.78 | | +1.83 | |

¹ Not tested.

As demonstrated by the data in the foregoing tables the increase in herbicidal action is especially large in the case of the substituted phenoxypropionic acid and phenoxybutyric acid compositions of the present invention.

EXAMPLE 3

(a) *Open field test on yellow oats (Brunotte).*—Sowings were made on March 31, 1958. Spraying on May 5, 1958, with 600 liters per hectare. Parcels almost exclusively overgrown by *Sinapis alba, Papaver dubium,* Chenopodium spec., *Galinsoga parviflora* and *Stellaria media.*
Herbicidal effect on weeds on June 13, 1958:

*Table 3*

| MCPA-K, kg./ha. | Na$_4$P$_2$O$_7$, kg./ha. | Tox. Val. |
|---|---|---|
| 1 | -------- | 6.0 |
| 1 | 1 | 6.5 |

| MCPP-K, kg./ha. | KH$_2$PO$_4$, kg./ha. | |
|---|---|---|
| 3 | -------- | 5.3 |
| 2.7 | 1.3 | 6.7 |

(b) *Open field test on summer wheat.*—A test carried out with potassium methylchorphenoxypropionate and potassium dihydrogen phosphate as shown in Table 4. The difference in grain yield between the last two tests is within the limits of statistical variation.

*Table 4*

| MCPP-K | KH$_2$PO$_4$, kg./ha. | Toxicity Value (4 weeks after treatment) | Grain Yield, Percent |
|---|---|---|---|
| -------- | Untreated | 0 | 100 |
| 3 | -------- | 8 | 111.5 |
| 2 | 1 | 8 | 114 |

EXAMPLE 4

*Greenhouse text.*—The phytotoxicity was determined of the sodium salt of trichlorphenoxyacetic acid (2,4,5-T-Na) to *Solanum lycopersicum,* sprayed at the 4-leaf stage with 1,000 liters per hectare, at an average temperature of 20.2° C. during the test period. The toxicity data given in Table 5 represent the average of 5 evaluations during the 10 day test period.

*Table 5*

| | Spraying | | | | | | |
|---|---|---|---|---|---|---|---|
| | 0.5 kg./ha. 2,4,5-T-Na | | | | 0.5 kg./ha. 2,4,5-T-Na+ 1 kg. KH$_2$PO$_4$ | | |
| Cultivation more than 2 days before spraying | Addition of KH$_2$PO$_4$ 2 days before spraying— Size of amount of phosphorus calcul. as P$_2$O$_5$ | | | | | | |
| | 0 | 2 | 10 | 50 | 2 | 10 | 50 |
| | | fould amount of compl. fertilization | | | 0 | fould amount of compl. fertilization | |
| Cultivation in phosphorus-poor soil without additional fertilization | 1.6 | 2.5 | 3.1 | 3.3 | 5.8 | 6.0 | 6.1 |
| Cultivation in phosphorus-poor soil +several complete fertilizations | 1.9 | 2.3 | 2.4 | 2.1 | 5.8 | 6.0 | 5.8 |

EXAMPLE 5

The phytotoxicity was determined of the potassium and sodium salt of methylchlorphenoxyacetic acid (MCPA-K) to *Solanum lycopersicum,* sprayed at the 4-leaf stage with 1,000 liters per hectare, average temperature during the test period 23° C. The toxicity values given in Table 6 represent the average of 5 evaluations during the test period of 8 to 16 days.

*Table 6*

| | Toxicity values |
|---|---|
| MCPA-K, 1 kg./ha. | 4.0 |
| MCPA-K, 1 kg./ha. and prim. potassium orthophosphate, 1 kg./ha. | 4.8 |
| MCPA-K, 1 kg./ha. and tetrapotassium pyrophosphate, 1 kg. ha. | 5.0 |
| MCPA-K, 1 kg./ha. and disodium pyrophosphate, 1 kg./ha. | 5.0 |
| MCPA-K, 1 kg./ha. and tetrasodium pyrophosphate, 1 kg./ha. | 4.8 |
| MCPA-Na, 1.15 kg./ha. | 4.25 |
| MCPA-Na, 1.15 kg./ha. and prim. sodium orthophosphate, 1 kg./ha. | 5.1 |
| MCPA-Na, 1.15 kg./ha. and prim. sodium orthophosphate, 10 kg./ha. | 4.8 |
| MCPA-Na, 1.15 kg./ha. and prim. potassium orthophosphate, 1 kg./ha. | 5.25 |
| MCPA-Na, 1.15 kg./ha. and prim. potassium orthophosphate, 10 kg./ha. | 4.8 |

EXAMPLE 6

*Greenhouse test.*—The phytotoxicity was determined of the diethanolamine salt of methylchlorphenoxypropionic acid (MCPP-Amin) to *Antirrhinum majus* and *Ageratum maxicanum,* sprayed at the 4-leaf stage with 1,000 liters per hectare, average temperature during the test period 12° C. The toxicity data given in Table 7 represent the average of 5 evaluations during the test period of 14 days.

*Table 7*

| | MCPP-Amin, kg./ha. | NaH$_2$PO$_4$, kg./ha. | KH$_2$PO$_4$, kg./ha. | Toxicity Values |
|---|---|---|---|---|
| *Antirrhinum majus* | 3.8 | -------- | -------- | 4.8 |
| | 3.8 | 1 | -------- | 8.2 |
| | 3.8 | -------- | 1 | 8.0 |
| *Ageratum mexicanum* | 3.8 | -------- | -------- | 3.4 |
| | 3.8 | 1 | -------- | 6.6 |
| | 3.8 | -------- | 1 | 6.6 |

EXAMPLE 7

*Greenhouse test.*—*Ageratum mexicanum, Antirrhinum majus, Galinsoga parviflora,* and *Stellaria media* were sprayed with 1 kg. of primary potassium orthophosphate per hectare. None of the plants showed any injury whatever.

EXAMPLE 8

(a) The phytotoxicity was determined of the potassium salt of MCPP to *Galium aparine,* sprayed at the stage of 3 to 4 leave-whorls with 1000 liters per hectare, average temperature during the test period of 14 days 15° C., the toxicity data given in Table 8 represent the average of 4 evaluations during the test period of 14 days.

Table 8

| MCPP-K, kg./ha. | KH₂PO₄, kg./ha. | Tox. Val. |
|---|---|---|
| 3 | --- | 6.75 |
| 2 | 1 | 7.5 |

(b) The phytotoxicity was determined of the potassium salt of MCPP to *Galium aparine*, sprayed at the stage of 6 to 7 leave-whorls with 1000 liters per hectare, the toxicity data given in Table 9 represent the evaluation after the test period of 32 days.

Table 9

| MCPP-K, kg./ha. | Tox. Val. |
|---|---|
| 3 | 5.83 |
| 2 | 4.33 |
| 1 | 1.83 |

EXAMPLE 9

*Greenhouse test.*—The phytotoxity was determined of the sodium salt of 2,4-dichlorophenoxybutyric acid (2,4-DB-Na) to *Solanum lycopersicum* sprayed at the 5-leaf stage with 1000 liters per hectare, average temperature during the test period 12° C. The toxicity data given in Table 10 represent the average of 4 evaluations during the test period of 7 days.

Table 10

| 2,4-DB-Na, kg./ha. | Na₄P₂O₇, kg./ha. | Tox. Val. |
|---|---|---|
| 1 | --- | 1.75 |
| 1 | 1 | 4.9 |

EXAMPLE 10

*Greenhouse test.*—The phytotoxicity was determined of the potassium salt of the methylchlorophenoxypropionic acid (MCPP–K) to *Sinapis alba* at the 4 leaf stage,[1] and *Centaurea cyanus* in the stage of small leaf rosettes sprayed with 100 liters per hectare. The toxicity data given in Table 11 represent the average of 5 values during the test period of 10 days.

Table 11

| MCPP-K, kg./ha. | Phosphate, kg./ha. | Tox. Val. | | |
|---|---|---|---|---|
| | | Sinapis | Stellaria | Centaurea |
| 2 | --- | 5.3 | 2.8 | 1.8 |
| 2 | 1 kg. KH₂PO₄ | 6.1 | 3.8 | 3.33 |
| 2 | 1 kg. Na₄P₂O₇ | 6.15 | 3.8 | 3.15 |

This test demonstrates that there is no remarkable difference in the effect of phosphates of acid or basic action.

EXAMPLE 11

The phytotoxicity was determined of combinations of different herbicides sprayed to *Centaurea cyanus* in the 4-leaf stage and *Matricaria chamomilla* in the 14-leaf stage with 1000 liters per hectare. The toxicity data given in Table 12 represent the average of 4 evaluations during the test period of 12 days (*Centaurea cyanus*) and 6 evaluations during 18 days (*Matricaria chamomilla*).

[1] *Stellaria media* in preflowering stage.

Table 12

| 50% MCPA-K, 50% 2,4-D-K, kg./ha. | Na₄P₂O₇, kg./ha. | Tox. Val. | |
|---|---|---|---|
| | | Centaurea | Matricaria |
| 1 | --- | 4.0 | 3.5 |
| 1 | 1 | 4.75 | 4.0 |
| 75% CMPP-K, 25% MCPA-K 25% MCPA-K | | | |
| 2 | --- | 3.75 | 3.5 |
| 2 | 1 | 7.75 | 4.5 |

EXAMPLE 12

The phytotoxicity was determined of the diethylamine salt of 2,4,5-trichlorophenoxypropionic acid (2,4,5-TP-amine) sprayed to *Galeopsis tetrahit* in the 8 leaf stage and *Stellaria media* in the stage before blooming with 1000 liters per hectare. The toxicity data represent the evaluation after 24 hours after spraying.

Table 13

| 2,4,5-TP-amine, kg./ha. | Na₂H₂P₂O₇, kg./ha. | Tox. Val. | |
|---|---|---|---|
| | | Galeopis | Stellaria |
| 1 | --- | 2.0 | 3.0 |
| 1 | 1 | 4.0 | 5.0 |

I claim:

Method for the destruction of weeds in cultivated stands which comprises applying to portions of said weeds above ground a herbicidal amount of an aqueous composition, consisting essentially of an aqueous solution of a mixture of from about 9 to about 92 percent by weight of a herbicidal active ingredient of the formula

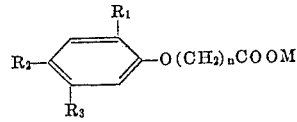

wherein $R_1$ is selected from the group consisting of H, Cl, and $CH_3$, $R_2$ is Cl, $R_3$ is selected from the group consisting of H and Cl, M is selected from the group consisting of H, an alkali metal, an alkylamine, and an alkanolamine, and $n$ is an integer from 1 to 3, and from about 8 to about 91 percent by weight of a water soluble salt of a phosphoric acid, said salt being selected from the group consisting of the alkali metal salts, alkaline earth metal salts, and ammonium salt, in an amount such that about 0.25 to 1.5 kg. of $P_2O_5$ are applied per hectare.

References Cited in the file of this patent

UNITED STATES PATENTS

| 2,326,471 | Lontz | Aug. 10, 1943 |
| 2,444,905 | Sexton | July 13, 1948 |
| 2,453,983 | Sexton | Nov. 16, 1948 |
| 2,709,648 | Ryker | May 31, 1955 |
| 2,768,889 | Twomey et al. | Oct. 30, 1956 |
| 2,792,295 | Wright | May 14, 1957 |

FOREIGN PATENTS

| 152,955 | Australia | Aug. 26, 1952 |
| 212,921 | Australia | Feb. 5, 1958 |